(12) United States Patent
Lagree et al.

(10) Patent No.: US 9,407,082 B2
(45) Date of Patent: Aug. 2, 2016

(54) ARC FLASH SYSTEM FOR A POWER CIRCUIT

(75) Inventors: James L. Lagree, Robinson Township, PA (US); John C. Schlotterer, Murrysville, PA (US); Ryan T. Flynn, Pittsburgh, PA (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 13/164,288

(22) Filed: Jun. 20, 2011

(65) Prior Publication Data

US 2012/0320486 A1 Dec. 20, 2012

(51) Int. Cl.
| | |
|---|---|
| H02H 3/00 | (2006.01) |
| H02H 9/08 | (2006.01) |
| H02H 1/00 | (2006.01) |
| H02H 3/08 | (2006.01) |
| H02H 7/00 | (2006.01) |

(52) U.S. Cl.
CPC .............. *H02H 1/0023* (2013.01); *H02H 3/08* (2013.01)

(58) Field of Classification Search
CPC ............................... H02H 3/08; H02H 1/0023
USPC ....................................................... 361/2, 42
See application file for complete search history.

(56) References Cited

U.S. PATENT DOCUMENTS

| | | | | |
|---|---|---|---|---|
| 4,404,612 A | * | 9/1983 | Hughes | H02H 7/0811 361/31 |
| 4,751,606 A | * | 6/1988 | Matsko | H02H 3/04 361/93.2 |
| 4,752,853 A | * | 6/1988 | Matsko | G05B 19/108 361/94 |
| 7,791,846 B2 | * | 9/2010 | Roscoe et al. | 361/2 |
| 2008/0170344 A1 | * | 7/2008 | Byron | 361/63 |

(Continued)

FOREIGN PATENT DOCUMENTS

| | | |
|---|---|---|
| EP | 2 270 944 A2 | 1/2011 |
| WO | 01/95452 A1 | 12/2001 |
| WO | 2008/138557 A1 | 11/2008 |

OTHER PUBLICATIONS

VAMP Ltd., "Arc flash Protection", VAMP Protection Systems, http://www.vampprotectionsystems.com/Arc_Flash_Protection.html, 2011, 3 pp.

(Continued)

*Primary Examiner* — Thienvu Tran
*Assistant Examiner* — Lucy Thomas
(74) *Attorney, Agent, or Firm* — Eckert Seamans Cherin & Mellott, LLC; Philip E. Levy; Grant E. Coffield

(57) ABSTRACT

An arc flash system includes a circuit breaker having separable contacts, an operating mechanism, a trip unit including a sensor sensing current flowing in a power circuit, a trip circuit cooperating with the operating mechanism to trip open the contacts responsive to the sensed current or a first signal, and a communication interface outputting the sensed current, and an interface circuit including a processor having a first output of the first signal, an input of a second signal, and a second output of a third signal, and a communication interface cooperating with the processor to determine and communicate cause of trip information to the trip unit communication interface, input the sensed current, and communicate the sensed current to the processor. A light sensor senses light from an arc flash associated with the power circuit and outputs the second signal. A shorting apparatus shorts the circuit responsive to the third signal.

21 Claims, 4 Drawing Sheets

(56) References Cited

U.S. PATENT DOCUMENTS

2010/0026425 A1* 2/2010 Roscoe et al. .................... 335/7
2010/0214724 A1* 8/2010 Dahl et al. .................... 361/621
2011/0216452 A1* 9/2011 Haines et al. .................... 361/42

OTHER PUBLICATIONS

VAMP Ltd., "VAMP 120", VAMP Protection Systems, http://www.vampprotectionsystems.com/VAMP_120.html, 2011, 3 pp.
VAMP Ltd., "VAMP 121", VAMP Protection Systems, http://www.vampprotectionsystems.com/VAMP_121.html, 2011, 3 pp.
VAMP Ltd., "VAMP 220 Product highlights", VAMP Protection Systems, http://www.vampprotectionsystems.com/VAMP_220.html, 2011, 3 pp.
VAMP Ltd., "VAMP 221", VAMP Protection Systems, http://www.vampprotectionsystems.com/VAMP_221.html, 2011, 3 pp.
Eaton Industries GMBH, "Arc Fault Protection System ARCON", Eaton Powering Business Worldwide, http://www.moeller.net/en/products_solutions/power_distribution/power_communication/arc_fault_protection/index.jsp, 2011, 2 pp.
European Patent Office, "extended European search report", Nov. 28, 2012, 6 pp.

* cited by examiner

ARC FLASH SYSTEM FOR A POWER CIRCUIT

BACKGROUND

1. Field

The disclosed concept pertains generally to power circuits and, more particularly, to arc flash reduction systems for such power circuits.

2. Background Information

Arc flash reduction systems are starting to be widely used. Some systems have the trip unit of a circuit breaker measure the fault current and try to trip the circuit breaker as fast as possible. This clears the fault and reduces the arc flash, but the speed of tripping is typically in the order of about 50 mS.

Some arc flash reduction systems use devices to detect light from an arc flash and a shunt trip device on a circuit breaker to open the circuit breaker and clear the fault.

Some systems use both light and measured current from external devices to detect the fault and then trip the circuit breaker using the shunt trip device on the circuit breaker.

Some relatively very expensive systems use both light and measured current from external devices to detect the fault and then initiate a mechanism to create a short across a three-phase bus to prevent any current from flowing downstream to the area of the fault. This controlled fault is then used to force a protective fault trip on an upstream circuit breaker.

U.S. Patent Application Publication No. 2010/0214724 discloses a power switch disposed in a housing including a contact breaker configured to connect and disconnect a low-voltage switchgear from a power source supplying the low-voltage switchgear. A triggering device is configured to disconnect the low-voltage switchgear in an overload event. A first evaluation device is configured to evaluate an accidental arc overcurrent, and a second evaluation device is configured to evaluate the accidental arc overcurrent. The power switch is configured to be activated via an overcurrent signal generated by an arc monitoring system in response to the accidental arc overcurrent. The overcurrent signal is linked to at least one triggering signal. The second evaluation device has a threshold above a threshold of the first evaluation device. The triggering device is configured to be activated via a turn-off pulse when a signal from a current detection device is above the threshold of the second evaluation device.

There is room for improvement in arc flash reduction systems.

SUMMARY

These needs and others are met by embodiments of the disclosed concept, which provide an interface circuit for a trip unit that inputs sensed current from the trip unit, and inputs a signal from a light sensor structured to sense light from an arc flash operatively associated with a power circuit and/or outputs a signal to a shorting apparatus structured to short the power circuit. A processor of the interface circuit is structured to determine and output cause of trip information from a communication interface of the interface circuit to a communication interface of the trip unit.

In accordance with one aspect of the disclosed concept, an arc flash system for a power circuit comprises: a circuit breaker comprising: separable contacts, an operating mechanism structured to open and close the separable contacts, a trip unit comprising a current sensor structured to sense a current flowing in the power circuit, a trip circuit cooperating with the operating mechanism to trip open the separable contacts responsive to the sensed current or a first signal, and a communication interface structured to output the sensed current, and an interface circuit comprising: a processor including a first output of the first signal to the trip circuit, an input of a second signal, and a second output of a third signal, and a communication interface cooperating with the processor and structured to communicate with the communication interface of the trip unit, input the sensed current, and communicate the sensed current to the processor, wherein the processor of the interface circuit is structured to determine and output cause of trip information from the communication interface of the interface circuit to the communication interface of the trip unit; a light sensor structured to sense light from an arc flash operatively associated with the power circuit and output the second signal; and a shorting apparatus structured to short the power circuit responsive to the third signal.

The processor of the interface circuit may be structured to determine the cause of trip information as a function of the sensed current and the second signal.

As another aspect of the disclosed concept, an arc flash system for a power circuit comprises: a circuit breaker comprising: separable contacts, an operating mechanism structured to open and close the separable contacts, a trip unit comprising a current sensor structured to sense a current flowing in the power circuit, a trip circuit cooperating with the operating mechanism to trip open the separable contacts responsive to the sensed current or a first signal, and a communication interface structured to output the sensed current, and an interface circuit comprising: a processor including an output of the first signal to the trip circuit, and an input of a second signal, and a communication interface cooperating with the processor and structured to communicate with the communication interface of the trip unit, input the sensed current, and communicate the sensed current to the processor, wherein the processor of the interface circuit is structured to determine and output cause of trip information from the communication interface of the interface circuit to the communication interface of the trip unit; and a light sensor structured to sense light from an arc flash operatively associated with the power circuit and output the second signal.

As another aspect of the disclosed concept, an arc flash system for a power circuit comprises: a circuit breaker comprising: separable contacts, an operating mechanism structured to open and close the separable contacts, a trip unit comprising a current sensor structured to sense a current flowing in the power circuit, a trip circuit cooperating with the operating mechanism to trip open the separable contacts responsive to the sensed current or a first signal, and a communication interface structured to output the sensed current, and an interface circuit comprising: a processor including a first output of the first signal to the trip circuit, and a second output of a second signal, and a communication interface cooperating with the processor and structured to communicate with the communication interface of the trip unit, input the sensed current, and communicate the sensed current to the processor, wherein the processor of the interface circuit is structured to determine and output cause of trip information from the communication interface of the interface circuit to the communication interface of the trip unit; and a shorting apparatus structured to short the power circuit responsive to the second signal.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; a programmable logic device (PLD); a combination of a plurality of logic gates; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is discussed in connection with a three-phase circuit breaker, although the disclosed concept is applicable to circuit breakers and power circuits having any number of phases.

Figure 1:
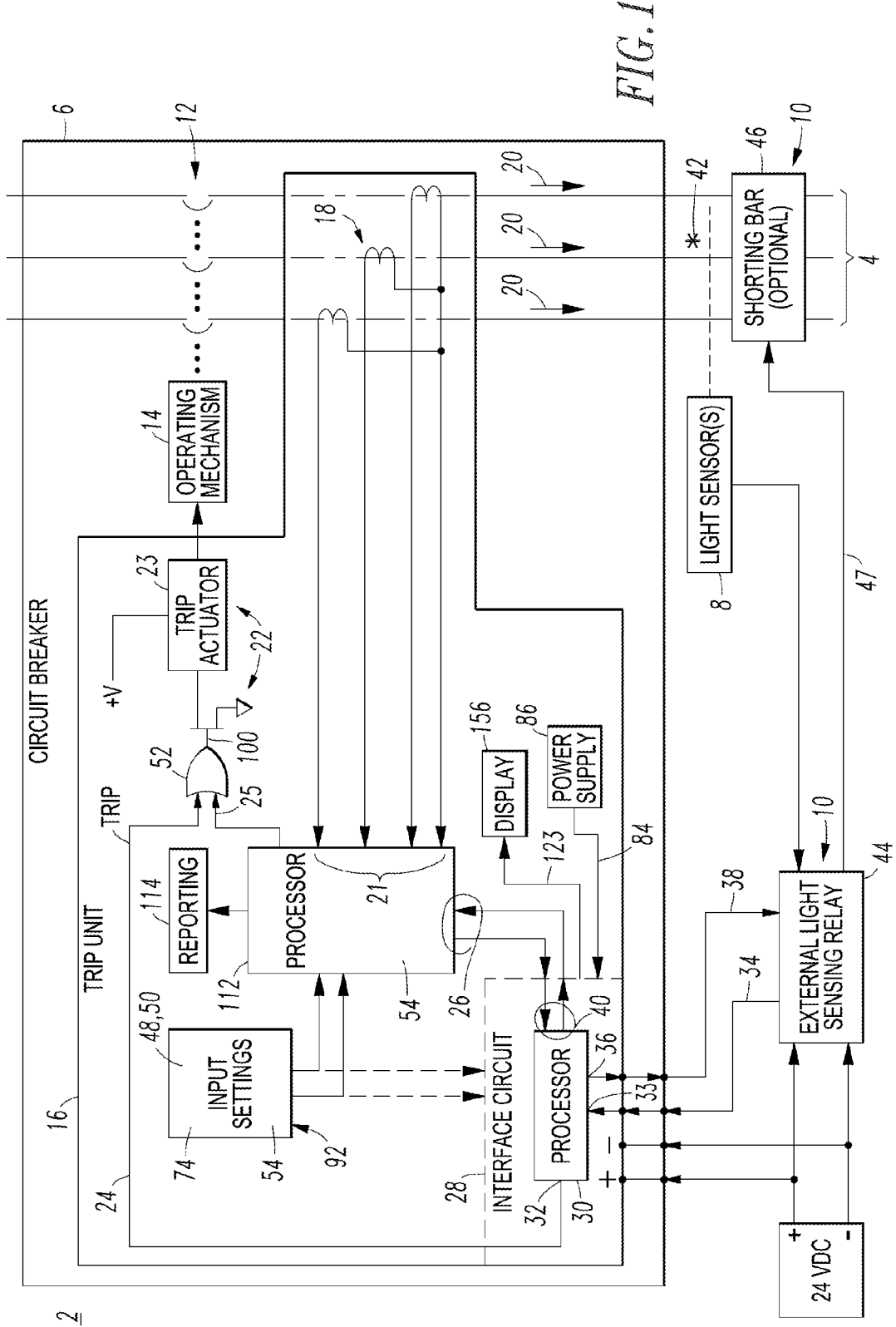
FIG. 1 is a block diagram of an arc flash system in accordance with embodiments of the disclosed concept.

Referring to FIG. 1, an arc flash system 2 is for a power circuit 4. The system 2 includes a circuit breaker 6, a light sensor 8 and a shorting apparatus 10. The circuit breaker 6 includes separable contacts 12, an operating mechanism 14 structured to open and close the separable contacts 12, a trip unit 16 including a current sensor 18 structured to sense a current 20 flowing in the power circuit 4, a trip circuit 22 cooperating with the operating mechanism 14 to trip open the separable contacts 12 responsive to sensed current 21 or a first signal 24, and a communication interface 26 structured to output the sensed current 21, and an interface circuit 28 including a processor 30 having a first output 32 of the first signal 24 to the trip circuit 22, an input 33 of a second signal 34, and a second output 36 of a third signal 38, and a communication interface 40 cooperating with the processor 30 and structured to communicate with the communication interface 26 of the trip unit 16, input the sensed current 21, and communicate the sensed current 21 to the processor 30.

The light sensor 8 (only one light sensor 8 is shown although a plurality of light sensors 8 can be employed) is structured to sense light from an arc flash 42 operatively associated with the power circuit 4 and output the second signal 34. The shorting apparatus 10 is structured to short the power circuit 4 responsive to the third signal 38. In the example configuration, which employs the shorting apparatus 10 and the light sensor 8, the system 2 trips both a shorting switch 46 (e.g., shown as a shorting bar) and the circuit breaker 6 on relatively high current (e.g., greater than a second threshold 50), and only trips the circuit breaker 6 on relatively low current (e.g., greater than a first threshold 48 but less than the second threshold 50).

The example shorting apparatus 10 includes an electronic device, such as the example intelligent protective relay 44, and the shorting switch 46 responsive to the intelligent protective relay 44, which inputs the second output 36 of the third signal 38 from the interface circuit processor 30 and responsively actuates the shorting switch 46 with a firing signal 47. The example shorting switch 46 shorts the example three-phase power circuit 4 to ground, although a wide range of shorting switches for power circuits having any number of phases can be employed. Optionally, the intelligent protective relay 44 can actuate the shorting switch 46 responsive to the second output 36 of the third signal 38 in combination with the second signal 34 being active from the light sensor 8.

The communication interface 40 of the interface circuit 28 is structured to communicate the input 33 of the second signal 34 to the trip unit communication interface 26 responsive to the second signal 34 from the light sensor 8.

In the example of FIG. 1, the trip unit 16 includes the interface circuit 28 and can optionally configure and/or control the interface circuit 28, although the interface circuit 28 can be part of the circuit breaker 6 or can be a device external to the trip unit 16 and the circuit breaker 6.

The shorting switch 46 is optional. In a configuration without the shorting switch 46, the light sensor 8 is present, and the interface circuit 28 causes a trip of the circuit breaker 6 if arc flash light is detected by the light sensor 8, and the sensed current 21 is greater than the first threshold 48 (THRESHOLD1) or is greater than the second threshold 50 (THRESHOLD2).

The light sensor 8 is optional. In a configuration without the light sensor 8, the shorting switch 46 is present, and the interface circuit 28 causes a trip of the circuit breaker 6 if the sensed current 21 is greater than the first threshold 48 (THRESHOLD1), or the interface circuit 28 causes a trip of the circuit breaker 6 if the sensed current 21 is greater than the second threshold 50 (THRESHOLD2), which is greater than the first threshold 48, and also actuates the shorting switch 46.

In a configuration with both of the shorting switch 46 and the light sensor 8, as shown in FIG. 1, the interface circuit 28 employs both of the arc flash light signal 34 from the light sensor 8 and the sensed current 21 from the trip unit 16 to determine that an arc flash event is in progress. This logic is provided by the interface circuit processor 30. The arc flash detection is communicated to the trip unit 16 by the interface circuit communication interface 40 and the trip unit communication interface 26 for information or reporting purposes only.

In the example arc flash system 2, the interface circuit 28 is part of the trip unit 16, which includes the trip circuit 22 to trip open the circuit breaker 6. The example trip circuit 22 can include a trip actuator 23, a flux transfer shunt trip (FTST) (not shown) or another suitable tripping mechanism (not shown). The trip circuit 22 includes an OR circuit 52, which allows either the example trip unit processor 112 or the interface circuit 28 and signal 24 to cause a trip of the circuit breaker 6.

As is conventional, the trip unit 16 trips the circuit breaker 6 for relatively high currents employing signal 25, albeit with a corresponding time delay. The interface circuit 28 allows the circuit breaker 6 to be set for normal protection at a relatively high current threshold 54, which is greater than the second threshold 50. However, if the sensed current 21 is less than the relatively high current threshold 54, but greater than the first threshold 48 and if there is an arc flash 42 as indicated by the light sensor signal 34, then a relatively quick trip of the circuit breaker 6 is desired, with no time delay. Also, if the sensed current 21 is relatively high (and greater than the second threshold 50) and if there is an arc flash 42 as indicated by the light sensor signal 34, then both a relatively quick trip of the circuit breaker 6 is desired, with no time delay, and also the shorting switch 46 is actuated by signal 38 to eliminate the arc flash event. For example, the arc flash event can arise from a relatively high resistance, such that there is light but not the relatively high current that exceeds the relatively high current threshold 54. Combining the sensed current 21 and arc flash light signatures reduces the occurrence of nuisance tripping better than relying upon only one of current detection and light detection.

Figure 2:
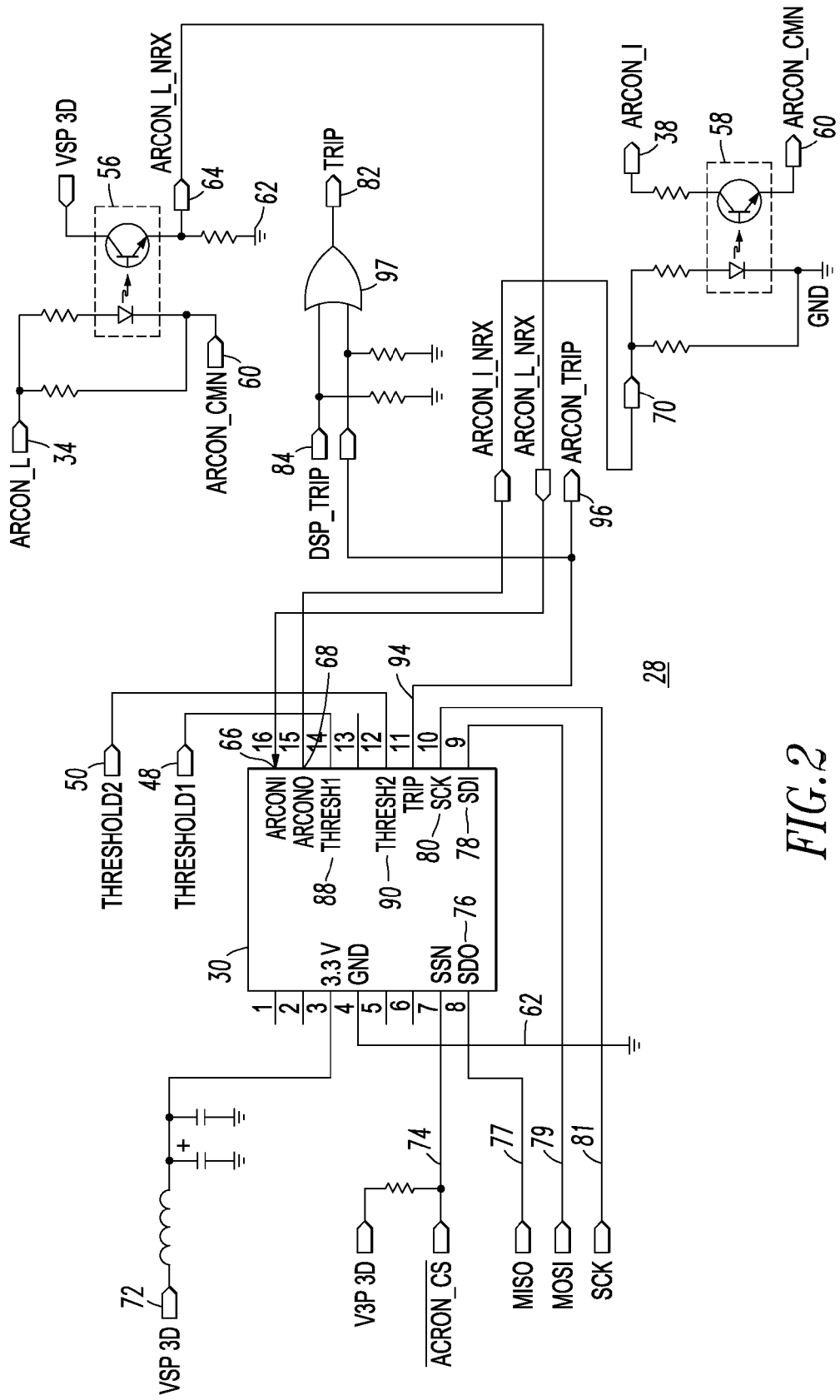
FIG. 2 is a block diagram in schematic form of the interface circuit of FIG. 1.

As shown in FIG. 2, the interface circuit 28 includes a first optical isolator 56 structured to isolate the second signal 34 (ARCON_L) from the light sensor 8 (FIG. 1), and a second optical isolator 58 structured to isolate the third signal 38 (ARCON_I) to the intelligent protective relay 44 (FIG. 1). The signals 34,38 are referenced to a common 60 (ARCON_CMN) that is isolated from the ground 62 (GND) of the interface circuit 28 and the trip unit 16 (FIG. 1) by the optical isolators 56,58. The output 64 (ARCON_L_NRX) of the first optical isolator 56 is communicated to the input 66 (ARCONI) of the processor 30. The output 68 (ARCONO) of the processor 30 is communicated to the input 70 (ARCON_I_NRX) of the second optical isolator 58.

The interface circuit processor 30 is powered by a suitable voltage (V3P3D) 72 (e.g., without limitation, 3.3 VDC) and the ground 62 (GND) from the trip unit 16.

The signal 74 (ARCON_CS/) is a low-true signal that enables the interface circuit 28. The signal 74 can be provided from any suitable source (e.g., without limitation, a master processor (not shown), the trip unit 16, the external shorting apparatus 10, or an external device that enables the external shorting apparatus 10 or light sensor 8), in order to enable or disable the interface circuit 28. For example, in response to being disabled, the interface circuit processor 30 takes no action in response to the sensed current 21.

The signal SDO 76 (serial data out) is connected to the trip unit signal MISO 77, the signal SDI 78 (serial data in) is connected to the trip unit signal MOSI 79, and the signal SCK 80 (serial clock) is connected to the trip unit signal SCK 81. The signals 76,78,80 form the communication interface 40 of the interface circuit 28, and the signals 77,79,81 form the trip unit communication interface 26, which permits the trip unit 16 to communicate with the processor 30. In this example, the two communication interfaces 26,40 are bi-directional serial interfaces, although any suitable parallel or serial communication interfaces can be employed. For example, communicated information to the processor 30 includes the sensed current 21, and communicated information to the trip unit 16 includes, for example and without limitation, the second signal 34 (ARCON_L) from the light sensor 8 (FIG. 1) as communicated by the output 64 (ARCON_L_NRX) of the first optical isolator 56 to the input 66 (ARCONI) of the processor 30, and whether the level of the sensed current 21 was the reason that the processor 30 sent a signal 82 (TRIP) to trip the circuit breaker 6.

The signal 84 (DSP_TRIP) is an output from the trip unit power supply 86 (FIG. 1) that trips the circuit breaker 6. The OR gate 97 enables either the signal 84 or the signal 96 to trip the circuit breaker 6.

The thresholds 48 and 50 are input to respective example analog inputs 88 (THRESH1) and 90 (THRESH2) of the processor 30. These can be established by user programmable settings on the trip unit user interface 92 (FIG. 1). Alternatively, the thresholds 48,50 can be communicated by the trip unit 16 to the interface circuit 28 through the communication interfaces 26,40.

The example shorting apparatus 10 and light sensor 8 may be part of an ARCON® arc-fault protection system for switchgear. The interface to that system includes the signal 34 (from the light sensor 8 sensing arcing light), the signal 38 (to the intelligent protective relay 44) and the common 60. If the signal 74 (ARCON_CS/) does not enable the interface circuit 28, then the signal 34 is ignored. If the signal 74 (ARCON_CS/) enables the interface circuit 28, but the sensed current 21 is below the thresholds 48,50, then the signal 34 is ignored. If the interface circuit 28 is enabled and the sensed current 21 is above the first threshold 48, then the interface circuit 28 outputs the signal 82 to trip the circuit breaker 6. If the interface circuit 28 is enabled and the sensed current 21 is above the second threshold 50, then the interface circuit 28 outputs the signal 82 to trip the circuit breaker 6, and also outputs the signal 38 to actuate the shorting switch 46.

The processor 30 includes an output 94 (TRIP) that provides a signal 96 (ARCON_TRIP) to an OR gate 97. In response to either of the signals 84,96, the OR gate 97 outputs the signal 82 (TRIP) (shown as signal 24 (TRIP) in FIG. 1) to the trip unit trip circuit 22. At the trip unit 16, another OR gate 52 inputs the signal 24 (TRIP) and outputs a signal 100 to a trip actuator 23 of the trip circuit 22.

Figure 3:
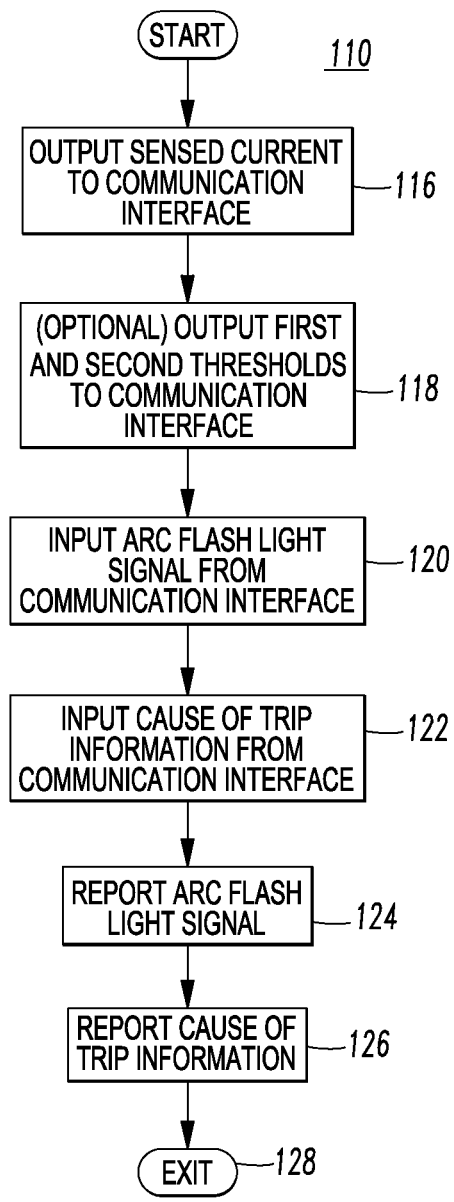
FIG. 3 is a flowchart of the processor of the trip unit of FIG. 1.

FIG. 3 shows a communication and reporting routine 110 of the trip unit processor 112 of FIG. 1. This routine 110 cooperates with the communication interface 26 of the trip unit 16 and with a reporting subsystem 114 of the trip unit 16. The reporting subsystem 114 may be, for example and without limitation, a local display (not shown) or an interface to a communication network (not shown).

First, at 116, the routine 110 outputs the sensed current 21 to the communication interface 26. Next, at 118, the routine 110 optionally outputs the first and second thresholds 48,50 to the communication interface 26. Alternatively, the first and second thresholds 48,50 are directly output as example analog signals from the trip unit user interface 92 (FIG. 1). Then, at 120, the signal 64 (ARCON_L_NRX) is input from the communication interface 26 to indicate whether arc flash light was detected. Next, at 122, cause of trip information 123 is input from the communication interface 26 to indicate whether the interface circuit processor 30 activated the signal 82 (TRIP) to the trip circuit 22 responsive to the sensed current 21 and the arc flash light signal 64 at one of the thresholds 48,50. Then, at 124, the arc flash light signal 64 is reported to the reporting subsystem 114. Next, at 126, the cause of trip information 123 is reported to the reporting subsystem 114. Finally, at 128, the routine 100 exits.

Figure 4:
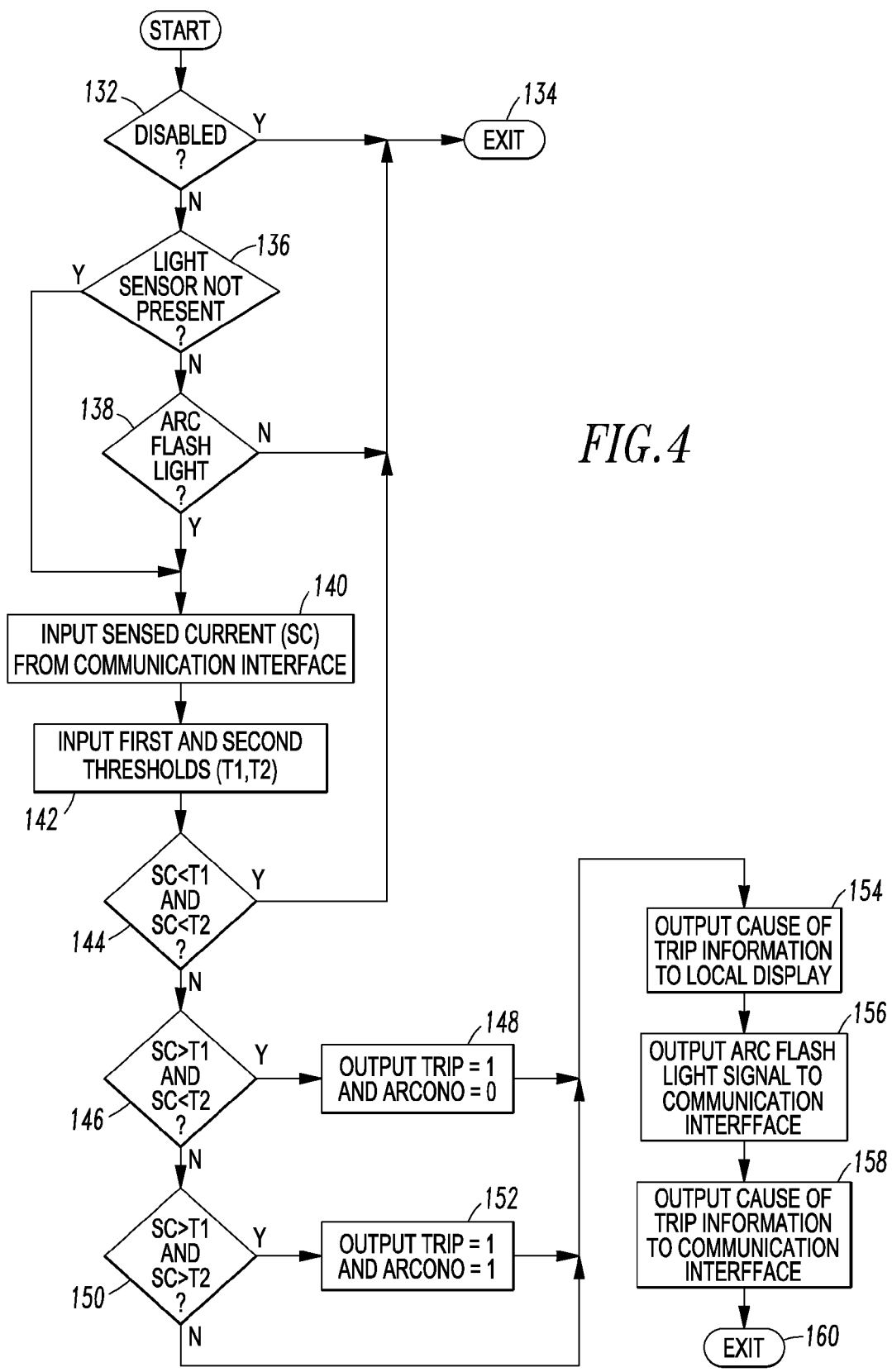
FIG. 4 is a flowchart of the processor of the interface circuit of FIG. 1.

FIG. 4 shows a routine 130 of the interface circuit processor 30 of FIG. 2. First, at 132, the routine 130 determines if the signal 74 (ARCON_CS/) has disabled the interface circuit 28. If so, then the routine 130 exits at 134. Otherwise, execution resumes at 136, where it is determined if the light sensor 8 is not present. If so, then execution resumes at 140. On the other hand, if the light sensor 8 is present, then, at 138, it is determined if the signal 64 (ARCON_L_NRX) indicates that arc flash light was detected. If not, then the routine 130 exits at 134. Otherwise, if arc flash light was detected, then execution resumes at 140, where the sensed current 21 is input from the communication interface 40 and indirectly from the trip unit communication interface 26. Next, at 142, the first and second thresholds 48,50 are input. These are optionally input from the communication interface 40 and indirectly from the trip unit communication interface 26. Alternatively, the first and second thresholds 48,50 are directly input as example analog signals from the trip unit user interface 92. Next, at 144, it is determined if the sensed current 21 is less than the first threshold 48 and less than the second threshold 50. If so, then the routine 130 exits at 134. Otherwise, at 146, it is determined if the sensed current 21 is greater than the first threshold 48 and less than the second threshold 50 (here, the second threshold 50 is not considered if there is no shorting switch 46). If so, then at 148, the first signal 24 is output to the trip circuit 22 without outputting the third signal 38 to the shorting apparatus 10. After 148, execution resumes at 154. On the other hand, if the test failed at 146, then, at 150, it is determined if the sensed current 21 is greater than the first threshold 48 and greater than the second threshold 50 (this test applies if there is the shorting switch 46). If so, then at 152, the first signal 24 is output to the trip circuit 22 and the third signal 38 is output to the shorting apparatus 10.

The cause of trip information is determined responsive to steps 138, 144, 146, 148, 150 and 152. After 148 or 152 or if the test failed at 150, at 154, the cause of trip information 123 is output to a local display 156. For example, when the circuit breaker 6 trips, the user wants to know why it tripped and from which protection feature. There are various relatively new types of tripping such as, for example and without limitation, ARMS, Zone Selective Trip, Making Current Release, Long Time, Short Time, INST, and Ground Fault. The disclosed concept communicates to the trip unit 16 or indicates on the local display 156 if there was either: (1) arc flash light and the sensed current 21 exceeded the second threshold 50, or (2) arc flash light and the sensed current 21 exceeded the first threshold 48 but not the second threshold 50, that caused the trip.

Next, at 156, the signal 64 (ARCON_L_NRX) is output on the communication interface 40 to the trip unit communication interface 26 to indicate whether arc flash light was detected.

Then, at 158, the cause of trip information 123 is output on the communication interface 40 to the trip unit communication interface 26 to indicate whether the interface circuit processor 30 activated the signal 82 (TRIP) to the trip circuit 22 responsive to the arc flash light signal 64 and the sensed current 21 at one of the thresholds 48,50.

Finally, after 158, the routine 130 exits at 160.

The disclosed concept provides a flexible, low cost interface circuit 28 for arc flash detecting and mitigating devices. This provides a relatively lower-cost arc flash detection system 2 by eliminating the need for an external current sensor, which is instead provided by the current sensor 18 of the circuit breaker trip unit 16.

Although separable contacts 12 are disclosed, suitable solid state separable contacts can be employed. For example, the disclosed circuit breaker 6 includes a suitable circuit interrupter mechanism, such as the separable contacts 12 that are opened and closed by the operating mechanism 14, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An arc flash system for a power circuit, said system comprising:
    a circuit breaker comprising:
        separable contacts,
        an operating mechanism structured to open and close said separable contacts,
        a trip unit comprising a current sensor structured to sense a current flowing in said power circuit, a trip circuit cooperating with said operating mechanism to trip open said separable contacts responsive to the sensed current or a first signal, and a communication interface structured to output the sensed current, and
    an interface circuit comprising:
        a processor including a first output of the first signal to the trip circuit, an input of a second signal, and a second output of a third signal, and
        a communication interface cooperating with said processor and structured to communicate with the communication interface of said trip unit, input the sensed current, and communicate the sensed current to said processor,
        wherein the processor of said interface circuit is structured to determine and output cause of trip information from the communication interface of said interface circuit to the communication interface of said trip unit, the cause of trip information indicating why the separable contacts were tripped open but not being a trip signal configured to cause the trip circuit to trip open the separable contacts;
    a light sensor structured to sense light from an arc flash operatively associated with said power circuit and output the second signal; and
    a shorting apparatus structured to short said power circuit responsive to the third signal.

2. The system of claim 1 wherein said interface circuit comprises an input of a first threshold and an input of a second threshold; wherein the processor of said interface circuit is further structured to determine that the sensed current is greater than the first threshold and less than the second threshold and responsively output the first output of the first signal to the trip circuit without outputting the second output of the third signal to said shorting apparatus; and wherein the processor of said interface circuit is further structured to determine that the sensed current is greater than the second threshold and responsively output the first output of the first signal to the trip circuit and output the second output of the third signal to said shorting apparatus.

3. The system of claim 2 wherein the processor of said interface circuit is further structured to take no further action in response to the sensed current if the sensed current is less than the first threshold and less than the second threshold.

4. The system of claim 1 wherein the input of the processor of said interface circuit is a first input; wherein said interface circuit further comprises a second input, which is structured to enable said interface circuit; and wherein the processor of said interface circuit is structured to take no action in response to the sensed current if said second input does not enable said interface circuit.

5. The system of claim 1 wherein the communication interface of said trip unit is a bi-directional serial interface; wherein the communication interface of said interface circuit is a bi-directional serial interface; and wherein information communicated over the bi-directional serial interfaces includes the sensed current, the cause of trip information and whether the processor of said interface circuit activated the first output of the first signal to the trip circuit responsive to the sensed current.

6. The system of claim 1 wherein said trip unit further comprises a power supply including a trip output; wherein said interface circuit further comprises an OR gate having a plurality of inputs and a third output; wherein one of the plurality of inputs is the trip output of said power supply; wherein another one of the plurality of inputs is the first output of the processor of said interface circuit; and wherein the output of said OR gate is output to the trip circuit.

7. The system of claim 1 wherein said shorting apparatus comprises an electronic device and a shorting switch responsive to said electronic device; and wherein said electronic device is structured to input the second output of the third signal from the processor of said interface circuit and responsively actuate said shorting switch.

8. The system of claim 7 wherein said electronic device is further structured to actuate said shorting switch responsive to the second output of the third signal in combination with the second signal from said light sensor.

9. The system of claim 1 wherein the communication interface of said interface circuit is structured to communicate the first input to the communication interface of said trip unit responsive to the second signal from said light sensor.

10. The system of claim 1 wherein said interface circuit further comprises a display; and wherein the processor of said interface circuit is further structured to output the cause of trip information to said display.

11. The system of claim 2 wherein the communication interface of said interface circuit is structured to input the first threshold and the second threshold from the communication interface of said trip unit.

12. The system of claim 1 wherein said interface circuit comprises a first optical isolator structured to isolate the second signal from said light sensor, and a second optical isolator structured to isolate the third signal to said shorting apparatus.

13. The system of claim 1 wherein the processor of said interface circuit is structured to determine the cause of trip information as a function of the sensed current and the second signal.

14. The system of claim 1, wherein said interface circuit comprises an input of a first threshold and an input of a second threshold, and wherein said cause of trip information indicates either: (i) detection of arc flash light and a sensed current exceeding the second threshold caused the trip circuit to trip open the separable contacts, or (ii) detection of arc flash light and a sensed current exceeding the first threshold but not the second threshold caused the trip circuit to trip open the separable contacts.

15. An arc flash system for a power circuit, said system comprising:
a circuit breaker comprising:
separable contacts,
an operating mechanism structured to open and close said separable contacts,
a trip unit comprising a current sensor structured to sense a current flowing in said power circuit, a trip circuit cooperating with said operating mechanism to trip open said separable contacts responsive to the sensed current or a first signal, and a communication interface structured to output the sensed current, and
an interface circuit comprising:
a processor including an output of the first signal to the trip circuit, and an input of a second signal, and
a communication interface cooperating with said processor and structured to communicate with the communication interface of said trip unit, input the sensed current, and communicate the sensed current to said processor,
wherein the processor of said interface circuit is structured to determine and output cause of trip information from the communication interface of said interface circuit to the communication interface of said trip unit, the cause of trip information indicating why the separable contacts were tripped open but not being a trip signal configured to cause the trip circuit to trip open the separable contacts; and
a light sensor structured to sense light from an arc flash operatively associated with said power circuit and output the second signal.

16. The system of claim 15 wherein the communication interface of said interface circuit comprises an input of a threshold; and wherein the processor of said interface circuit is structured to determine that the sensed current is greater than the threshold and responsively output the output of the first signal to the trip circuit.

17. The system of claim 16 wherein the processor of said interface circuit is further structured to take no further action in response to the sensed current if the sensed current is less than the threshold.

18. The system of claim 15, wherein said interface circuit comprises an input of a first threshold and an input of a second threshold, and wherein said cause of trip information indicates either: (i) detection of arc flash light and a sensed current exceeding the second threshold caused the trip circuit to trip open the separable contacts, or (ii) detection of arc flash light and a sensed current exceeding the first threshold but not the second threshold caused the trip circuit to trip open the separable contacts.

19. An arc flash system for a power circuit, said system comprising:
a circuit breaker comprising:
separable contacts,
an operating mechanism structured to open and close said separable contacts,
a trip unit comprising a current sensor structured to sense a current flowing in said power circuit, a trip circuit cooperating with said operating mechanism to trip open said separable contacts responsive to the sensed current or a first signal, and a communication interface structured to output the sensed current, and
an interface circuit comprising:
a processor including a first output of the first signal to the trip circuit, and a second output of a second signal, and
a communication interface cooperating with said processor and structured to communicate with the communication interface of said trip unit, input the sensed current, and communicate the sensed current to said processor,
wherein the processor of said interface circuit is structured to determine and output cause of trip information from the communication interface of said interface circuit to the communication interface of said trip unit, the cause of trip information indicating why the separable contacts were tripped open but not being a trip signal configured to cause the trip circuit to trip open the separable contacts; and
a shorting apparatus structured to short said power circuit responsive to the second signal.

20. The system of claim 19 wherein the communication interface of said interface circuit comprises an input of a first threshold and an input of a second threshold; wherein the processor of said interface circuit is structured to determine that the sensed current is greater than the first threshold and less than the second threshold and responsively output the first output of the first signal to the trip circuit without outputting the second output of the second signal to said shorting apparatus; and wherein the processor of said interface circuit is further structured to determine that the sensed current is greater than the second threshold and responsively output the first output of the first signal to the trip circuit and output the second output of the second signal to said shorting apparatus.

21. The system of claim 20 wherein the processor of said interface circuit is further structured to take no further action in response to the sensed current if the sensed current is less than the first threshold and less than the second threshold.

* * * * *